United States Patent [19]
Clevenger, Jr. et al.

[11] 3,892,286
[45] July 1, 1975

[54] FINE SPEED CONTROL FOR A VEHICLE

[75] Inventors: James T. Clevenger, Jr., Lancaster; Gary C. Snyder, New Holland, both of Pa.

[73] Assignee: Sperry Rand Corporation, New Holland, Pa.

[22] Filed: June 26, 1973

[21] Appl. No.: 373,831

[52] U.S. Cl................ 180/77 R; 180/66 R; 74/479
[51] Int. Cl.².................. B60K 41/00; G05G 11/00
[58] Field of Search................... 180/66, 77; 74/479

[56] References Cited
UNITED STATES PATENTS

| | | | |
|---|---|---|---|
| 2,705,624 | 4/1955 | Robbins | 299/80 |
| 2,955,483 | 10/1960 | Slomer | 74/479 |
| 3,020,893 | 2/1962 | Hamblin et al. | 180/66 F |
| 3,612,204 | 10/1971 | Allen | 180/66 F |

*Primary Examiner*—Trygve M. Blix
*Assistant Examiner*—Sherman D. Basinger
*Attorney, Agent, or Firm*—John R. Flanagan; Frank A. Seemar; Joseph A. Brown

[57] ABSTRACT

A fine speed control associated with the coarse speed control of a vehicle, to select and maintain the speed of the vehicle. The fine speed control is interconnected to a coarse speed control in such a way that when disengaged it will linearly move in direct relationship to any forward or rearward movement of the coarse speed control. The improved speed control includes a connecting assembly for interconnecting the fine speed control to the coarse speed control, a main body portion, and a control lever operably associated with the main body portion. The control lever engages the main body portion in a manner such that the operator can, by moving the coarse speed control, temporarily and instantaneously override the fine speed control without requiring disengagement thereof. The main body portion of the fine speed control includes expanding and contracting properties which permit automatic movement of an activator of a driver that drives the ground engaging portion of the vehicle. Stalling out or damage to the power source under increased power demands is effectively obviated by this automatic movement.

10 Claims, 6 Drawing Figures

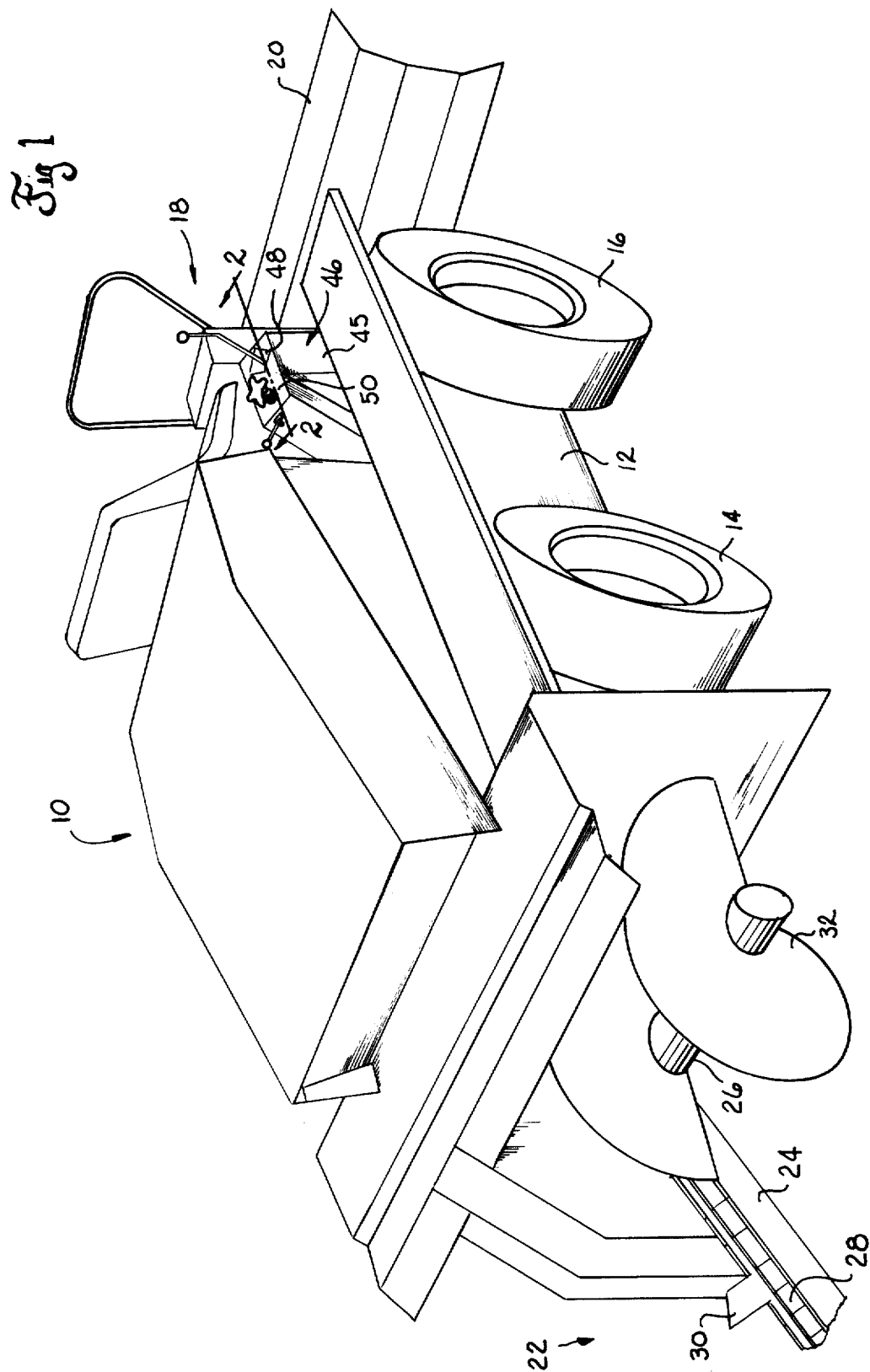

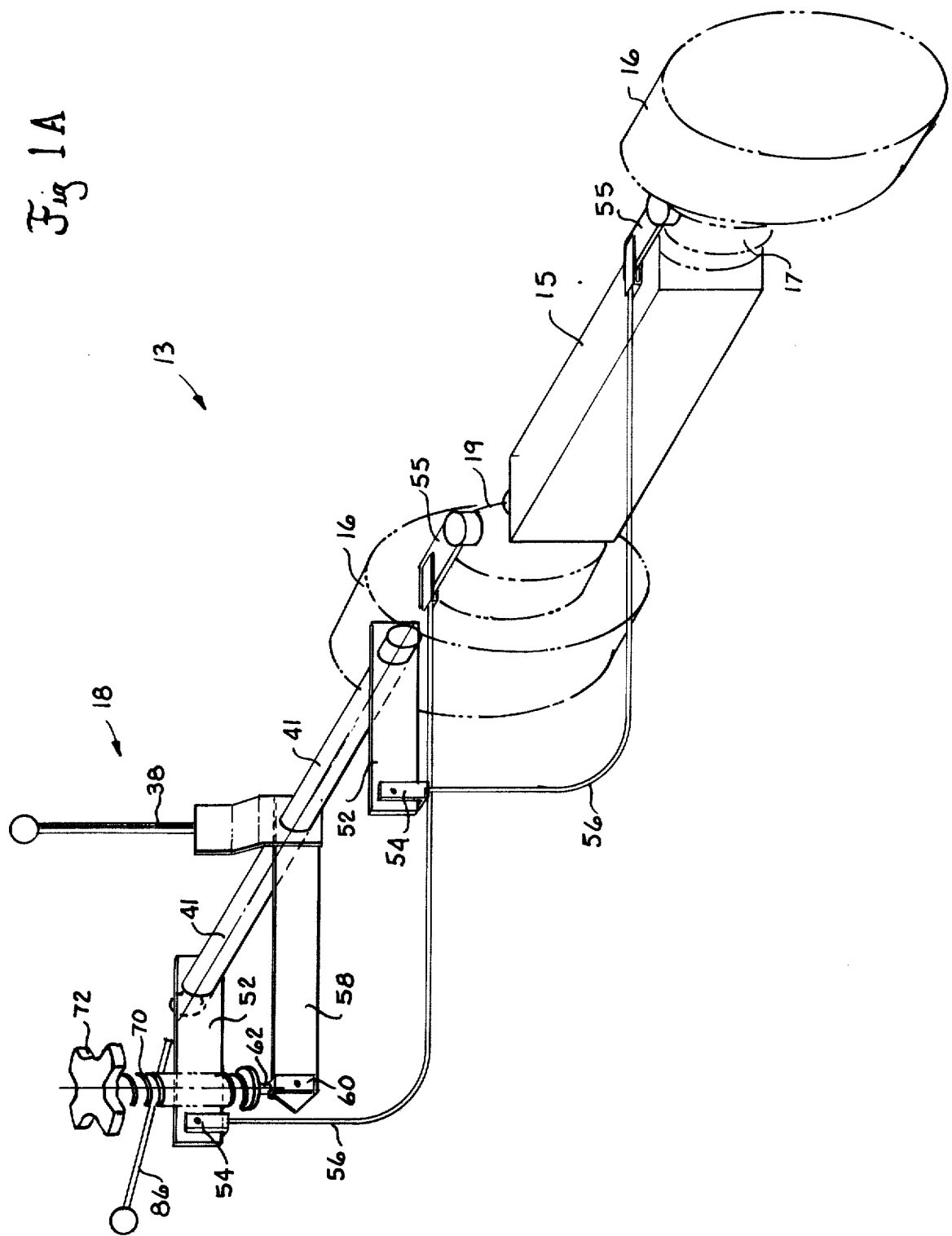

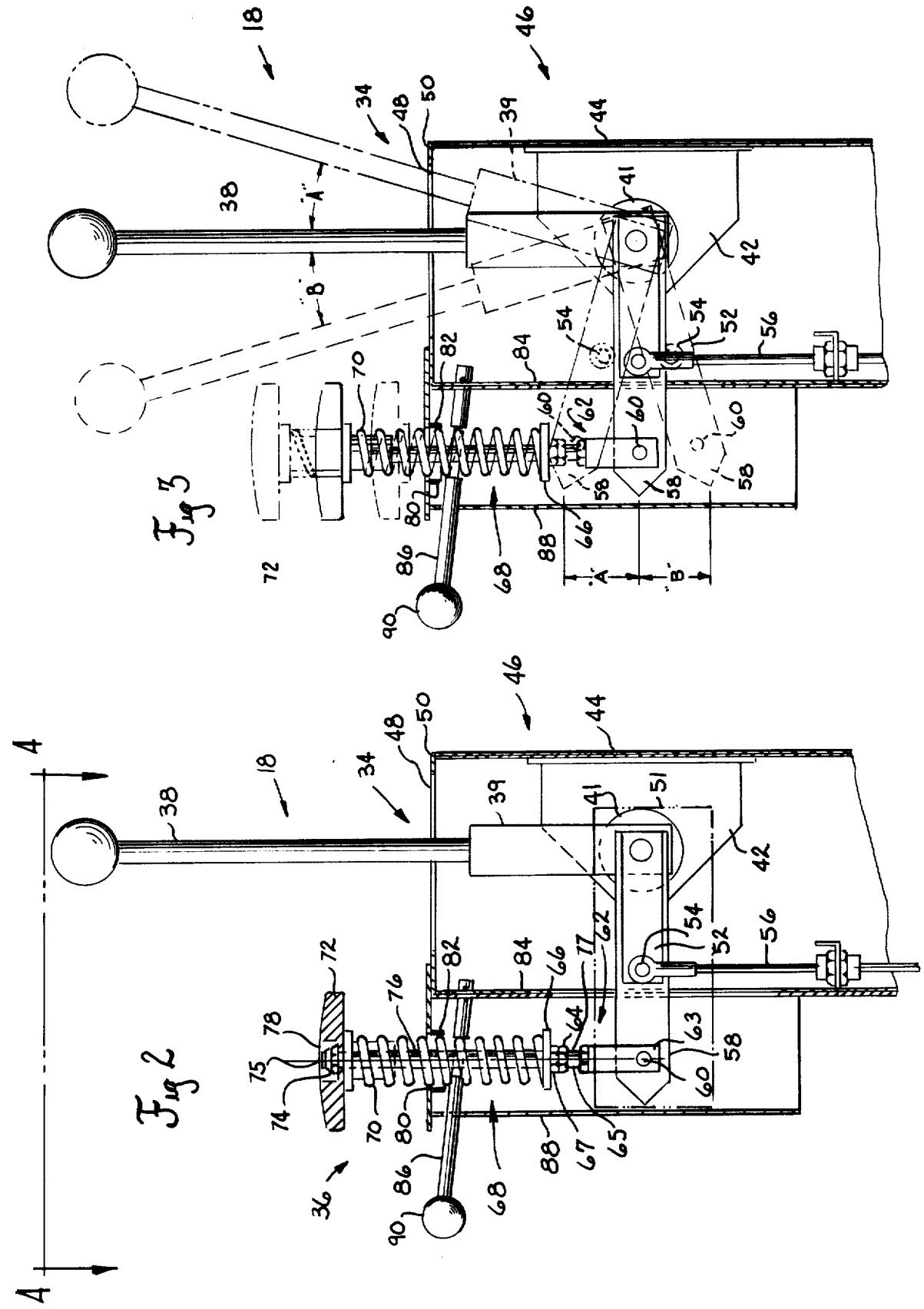

FINE SPEED CONTROL FOR A VEHICLE

BACKGROUND OF THE INVENTION

This invention relates generally to a device for controlling the speed of a vehicle, and more particularly, to a fine speed control associated with a coarse speed control to more precisely set and control the desired speed of the vehicle.

Vehicles of the type having earthworking implements associated therewith are generally required to operate over a wide range of speed and power settings. To supply the power requirements necessary to operate these vehicles, sophisticated hydrostatic transmissions have been developed. These transmissions are capable of providing a range of speeds through which earthworking vehicles operate while further providing sufficient power to perform the task for which the vehicle was designed. Throughout the years, many innovations have focused directly on hydrostatic transmissions, and more particularly, to a means for controlling the speed and power output of such transmissions. Recently, earthworking vehicles have been provided with a single control arm, commonly referred to as a monostick, through which the operator can control not only the forward and reverse movement and speed of the vehicle but its direction as well. These single control arms are generally connected through cables or other suitable connections to the activating arms of the hydrostatic transmission. The connections are such that when the control arm is moved in a particular direction, the connections to the activating means of the hydrostatic transmission respond and thereby activate simultaneously the respective motors connected to the driven wheels of the vehicle. These connections, from the control arm to the activating means of the hydrostatic transmission, are geometrically arranged so that upon movement of the control arm in either a forward or rearward direction, the motors of the hydrostatic transmission will be activated precisely the same amount to effect propulsion of said vehicle in a straight path. If the operator desires to turn the vehicle, he moves the control arm towards the direction in which he wishes the vehicle to travel and, in so doing, manipulates the connections to the activating means of the hydrostatic transmission so that the motor controlling the rotation of the outside wheel of the turn will be activated to achieve a greater speed than the motor which controls the rotation of the wheel positioned on the inside of the turn.

Recently, coarse speed controls have been associated with a fine or vernier speed control which can both infinitely control the speed of the vehicle and lock the vehicle in a particular speed during its operation. These fine speed controls are generally directly connected in one way or another to the coarse speed control mechanism of the type generally set forth above.

The fine speed controls, presently being used with earthworking vehicles, provide several limitations and disadvantages with which the operator of the vehicle must contend. These limitations and disadvantages include inability to return to neutral position upon disengagement; inability to permit the operator through the use of the control arm of the coarse speed control to override the fine speed control after the fine speed control has been engaged; and also, these fine speed controls are not adapted to compensate for movement of the hydrostatic transmission activating means under conditions where the vehicle is sporadically required to generate greater torque for a particular interval of time.

The first disadvantage, relating to inability of present fine speed controls to return to an initial or neutral position upon disengagement of the fine speed control, frequently presents a situation in which the operator, upon engagement of the fine speed control, finds that he does not have a sufficient amount of movement in his fine speed control to set the speed of the vehicle at the speed he desires. This necessitates disengagement of the fine speed control for manual return to its initial position. After return thereof to the initial position, it must then be re-engaged and again manually set to the particular speed in which he desires to travel. This type of operation presents numerous difficulties as well as inconveniences to the operator of an earthworking vehicle since he must completely stop the vehicle to reposition the fine speed control.

The second disadvantage relates to the operator's inability to manually override the setting of the fine speed control, after engagement thereof, without completely disengaging the fine speed control. This creates a situation in which the vehicle may be traveling over the ground at a speed set by the operator through the use of the fine speed control, and for one reason or another if he wishes to instantaneously either accelerate or decelerate the speed of the vehicle he must, with the fine speed controls presently in use, disengage the fine speed control and manually set the control arm of the coarse speed control to the new desired speed in which he wishes to travel. If the operator could without having to disengage the fine speed control reset his speed simply by moving the control arm of the coarse speed control to the speed in which he wishes to travel for a particular interval of time, it would eliminate his having to manually disengage the fine speed control, and then re-engaging the fine speed control and repositioning said fine control to the particular speed he was in prior to the time he felt it necessary to alter the speed of the vehicle.

The third disadvantage mentioned above, inherent in fine speed controls, presently available, is their inability to compensate for increased load requirements during normal operation of the vehicle. Hydrostatic transmissions as generally designed today will, when additional torque is required to propel the vehicle over the ground, attempt to return the activating means of interrelated pumps to their neutral position thereby decreasing the flow of fluid into the drive motors for the wheels of the vehicle. This movement of the activating means of the pumps decreases the RPM of the motor and consequently, increases torque supplied to the wheels. If the activating means of the hydrostatic transmission are prevented from moving toward the neutral position, thereby increasing torque supplied to the driven wheels of the vehicle, the engine will not be permitted to supply additional torque to the wheels of the vehicle and thus cause the vehicle to stall during increase load conditions. Accordingly, positioning and maintaining the activating means upon engagement of the fine speed controls used with present day earthworking vehicles, presents many problems. For example, since the activating means of the pumps are prevented from moving towards a neutral position after the fine speed control is engaged, hydrostatic transmissions in the prior art are prevented from compensating for any increase in the amount of torque necessary to propel the vehicle.

OBJECTS AND BRIEF DESCRIPTION OF THE INVENTION

It is, therefore, the main object of this invention to provide a fine speed control to be used in combination with an earthwroking vehicle which will eliminate any of the inconveniences or disadvantages inherent in the fine speed controls presently in use.

Another object of this invention is to provide a fine speed control operably connected to a coarse speed control of a earthworking vehicle which will, upon disengagement, return to its initial or neutral position.

Another object of this invention is to provide a fine speed control interconnected with the coarse speed control used with an earthworking vehicle which will allow the operator to override the setting of the fine speed control without disengaging the fine speed control.

Another object of this invention is to provide a fine speed control operably interconnected to the coarse speed control used with an earthworking vehicle which while engaged is responsive to any increased load requirements of the wheels of the vehicle.

Another object of this invention is to provide a fine speed control operably interconnected to the coarse speed control which can accurately set and retain the coarse speed control device in any position throughout its entire operable range.

The present invention contemplates an improved control device comprising a connecting assembly for interconnecting a fine speed control to a coarse speed control, a main body portion, and a control lever operably associated with the main body portion. The control lever is adapted to engage the main body portion to allow the fine speed control to set and maintain the coarse speed control in any position throughout its entire operable range, and to permit the coarse speed control to either automatically or manually override said setting without disengaging the fine speed control.

The foregoing and other objects, features and advantages of this invention will be apparent to those skilled in the art after a consideration of the following detailed description, taken in conjunction with the accompanying drawings, in which the preferred form of this invention is illustrated.

IN THE DRAWINGS

FIG. 1 is a perspective view of an earthworking vehicle taken from the right rear of the vehicle.

FIG. 1a is an isometric view of the control means and the interconnected drive means.

FIG. 2 is a sectional view taken along line 2—2 of FIG. 1 showing the coarse speed control and the interconnected fine speed control.

FIG. 3 is a sectional view taken along line 2—2 of FIG. 1 showing the coarse speed control and the fine speed control in various operating positions.

DESCRIPTION OF THE PREFERRED EMBODIMENT

Figure 5:
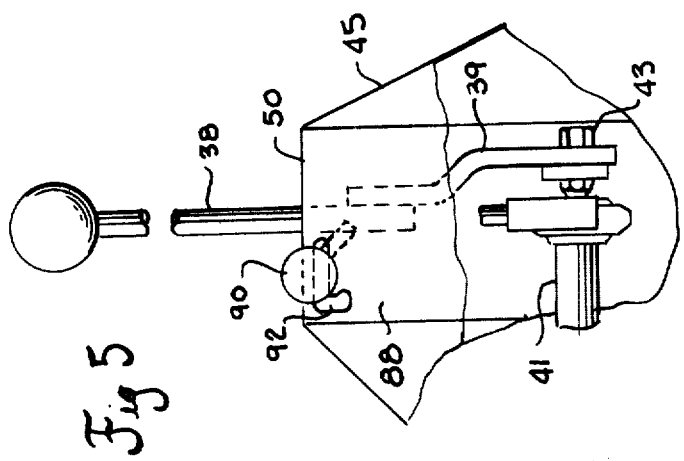
FIG. 5 is an end view taken along line 5—5 of FIG. 4.
Figure 4:
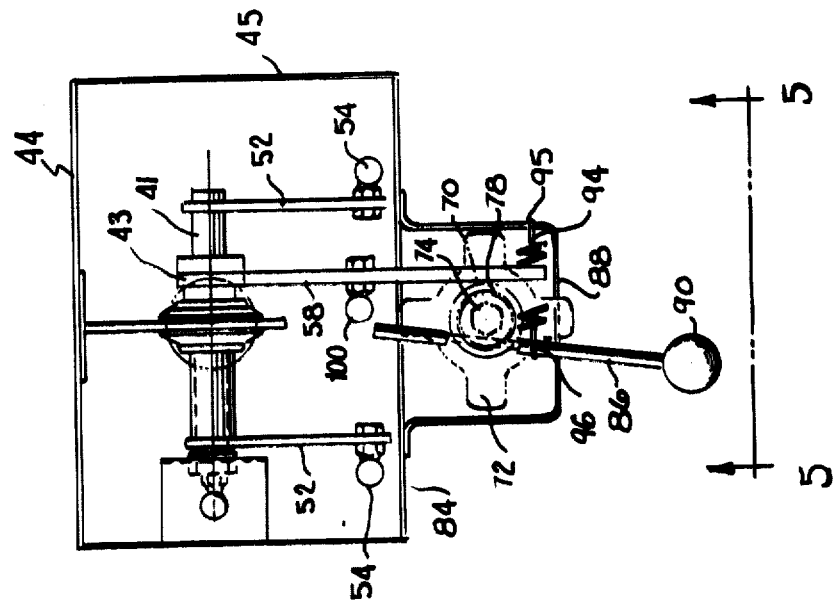
FIG. 4 is a plan view of FIG. 2 showing the interconnection and alignment of the coarse speed control with the fine speed control.

In the following description, right-hand and left-hand reference is determined by standing to the rear of the earthworking vehicle and facing the direction of travel.

A fine speed control system according to the invention is embodied in an earthworking vehicle generally designated 10, mounted upon frame 12, which is supported for travel across the ground by right and left pairs of wheels 14 and 16 (only one wheel of each pair being shown). Included on frame 12 is a drive means 13 which powers hydrostatic transmission 17 and 19 which are drivingly connected to the wheels 16 of the vehicle. Additionally associated with drive meand 13 is pump 15 and control means 18 operably associated with the hydrostatic transmissions 17 and 19 of the drive means, said control means being manually operable to control both the speed and the direction of travel of the vehicle 10.

As illustrated in FIG. 1, on the forward end of the frame 12 is mounted a plow 20 which forms no part of the present invention while on the rear of frame 12 is mounted a trenching apparatus, generally designated 22.

While an earthworking vehicle employing a trenching apparatus 22 is shown as the work performing means mounted on the earthworking vehicle, as will become apparent hereafter, the invention is not intended to be so limited. For example, the work performing means could by any type of device which performs work as the vehicle moves along the ground.

In any event, the trenching apparatus 22 comprises a boom 24 which is mounted on rotatable shaft 26 which is operably connected to a power source, not shown, said shaft being pivotally mounted on frame 12. The endless chain 28 is provided with digging blades 30 which dig and propel material which it contacts out of the trench. Additionally, there are provided augers 32 which are mounted on the rotatable shaft 26. These augers clear excavated material away from the trench and deposit the material conveniently along the side of the trench so that after the trenching operation, the ditch can be refilled simply by pushing the excavated material back in the trench. Endless chain 28 is powered by driven sprockets, not shown, which are operably connected to rotatable shaft 26.

Turning now to FIG. 2, the vehicle control means 18 containing the coarse speed control 34 and the fine speed control 36 is shown in detail. The speed control 34 comprises a control arm 38 whose lower end is welded to the upper end of fastening plate 39. The opposite or lower portion of fastening plates 39 is rigidly mounted to a rotatable control shaft 41 by control arm connection 43. Rotatable control shaft 41 is supported for rotational movement by bracket 42 which is rigidly mounted to the front wall 44 of the control means housing 46. The control means housing 46 is provided with a front wall 44, sidewall 45, top wall 50 and rear wall 88. The control means housing 46 has an opening 48 in its top wall 50, said opening having a rhombic configuration which will allow movement of control arm 38 through its entire range of positions. As shown in FIG. 2 the control arm 38 is in its neutral position.

Rigidly mounted to rotatable control shaft 41, on either side of control arm connection 43 are arms 52 which extend perpendicularly from the control shaft 41. Arms 52 are connected to control shaft 41 so that any rotational movement imparted to said shaft will cause arms 52 to move in a vertical plane. The ends of arms 52 are provided with a pivotal connection 54 which secures one end of a connecting means 56 to the arms 52, thereby coordinating the movement of said connecting means 56, control shaft 41 and the control arm 38 portion of the control means 18. Also, rigidly connected to the control shaft 41 is an interconnecting means 58 which extends perpendicularly from the control shaft in the same plane as the arms 52. The interconnecting means 58 has, on its end opposite its rigid connection, mounting means 60 capable of receiving the lower portion of the fine speed control 36 so as to operably interconnect the coarse speed control 34 to the fine speed control 36.

As best seen in FIGS. 2 and 3, all of the projections are rigidly mounted to the control shaft 41 in such a way that when either arms 52, or interconnecting means 58 are moved vertically, a direct movement will be imparted to control shaft 41 and associate control arm 38. Similarly, if control arm 38 is moved in a forward or rearward direction this would cause control shaft 41 to pivot thereby moving both the rigidly mounted arms 52, and interconnecting means 58 vertically through a relative distance. For future reference the combination of arms 52 with their pivotal connections 54, interconnecting means 58, with its associated mounting means 60, and rotatable control shaft 41 will be referred to as the coarse speed control's lower linkage 51. The movement imparted to linkage 51 of the coarse speed control will be transmitted to the connection means 56 which have one end pivotally connected to the arms 52 while their other end is operably interconnected to the activating means 55 of the hydrostatic transmissions, 17 and 19, of the vehicle. So when control arm 38 is moved either forwardly or rearwardly, a vertical movement will be imparted to the connection means 56 thereby activating the hydrostatic transmission and setting the speed of the vehicle to correspond to the movement of connection means 56.

Associated with mounting means 60 of the interconnecting means 58 is the lower portion of the fine speed control 36. The lower portion of the fine speed control includes a ball joint assembly 62 having one end 63 mounted to the mounting means 60 of the interconnecting means 58 while its other end 65 is secured to a connecting and locking assembly 64. The connecting and locking assembly 64 generally consists of locknuts 67 positioned so that they are able to receive end 65 of the ball joint assembly 62 while securely retaining the supporting means 66 adjacent and below the main body portion 68 of the fine speed control.

The main body portion 68 of the fine speed control 36 includes a spring 70, a knob 72, holding means 74 and rod 76. Rod 76 is positioned through the center of spring 70 and has threaded ends 75,77 which extend beyond the length of spring 70, said ends being so threaded so as to secure the connecting and locking assembly 64 to its end 77 while holding means 74 is secured to end 75. The supporting means 66 consists of a rigid washer which contains an opening through which threaded end 77 of rod 76 passes to enable end 77 to be connected to the locknut 67 of the connecting and locking assembly 64. Supporting means 66 further functions so as to enable spring 70 to rotate relative to the position of the supporting means, i.e., the lower end of spring 70 can freely rotate relative said supporting means without changing the position or in any other way effecting the supporting means. The knob 72 of the main body portion is rigidly fastened to the end of spring 70 opposite the supporting means 66 so that rotation of the knob will rotate the spring in either a clockwise or counterclockwise direction. Included in knob 72 is a cavity portion 78 capable of receiving the holding means 74 which is secured to threaded end 75 of rod 76. This type connection permits rod 76 to remain in a particular position while permitting either compression or expansion of spring 70 relative to the fixed position of rod 76. This movement by spring 70 relative to the fixed position of rod 76 is an important innovation relating to the override and automatic adjusting properties of fine speed control 36. The entire main body portion 68 of the fine speed control 36 is positioned through an opening 80 in the top wall 50 of the control means housing 46. This opening is provided with a collar 82 which protrudes down into the opening so that the spring will not engage the sides of opening 80 thereby interferring with the free vertical movement of the main body portion 68 of the fine speed control.

Pivotally mounted to inner wall 84 of control means housing 46 is control lever 86 which extends through an opening provided in the rear wall 88 of the control means housing. The control lever 86 is mounted so that the lever can be moved between the helix of spring 70 to engage and away from the helix of spring 70 to disengage the fine speed control 36. When control lever 86 is moved between the helix of spring 70 the fine speed control 36 is engaged so that any rotational movement of the spring in either a clockwise or counterclockwise direction, will move the main body of the fine speed control 68 vertically relative to the position of the control lever 86. It is this simulated threading effect of the helix of spring 70, moving relative to the inserted control lever 86 which produces the fine speed control properties of the particular invention.

As illustrated in FIG. 3 as spring 70 is rotated in either a clockwise or counterclockwise direction after its engagement, it will move vertically causing the end of interconnecting means 58 to correspondingly move thereby moving the entire lower linkage 51 to a new position. This movement of lower linkage 51 causes arms 52 to move in accordance with the movement of interconnecting means 58 thereby placing connecting means 56 and the activating means 55 of the hydrostatic transmissions, 17 and 19, in a new position thereby changing the speed of the vehicle. The control lever 86 comprises a knob 90, a gate assembly 92 (see FIG. 5) which positions and maintains the control lever 86 in either an engaged or disengaged position, and a positioning spring 94 which has one end 95 mounted to sidewall 45 of control means housing 46 and the other end 96 connected to the control lever. The control lever will tend to automatically be moved by spring 94 into the helix of spring 70 when the control lever 86 is so positioned in gate assembly 92, said positioning spring 94 further preventing any premature disengagement of the control lever with spring 70.

Again referring to FIG. 3, as control arm 38 is moved in a forward direction, i.e., away from the fine speed control 36, control shaft 41 is rotated in a clockwise direction causing arms 52, and the interconnecting means 58 to move vertically a distance "A" which is relative to the rotational movement of control shaft 41.

As a result, the entire lower linkage 51 consisting of arms 52 and interconnecting means 58 will be moved upwardly and, in view of this movement, the connecting means 56 will also be moved upwardly relative to the rotational movement of the control shaft. Such movement of connecting means 56 will result in the movement of the actuating means 55 of the hydrostatic transmissions, 17 and 19, in such a manner as to power the vehicle for forward movement along the ground. Directly dependent upon the degree of movement of control arm 38, the rotational position of control shaft 41 and the vertical movement of connecting means 56 is the flow rate generated by the hydraulic pumps of the hydrostatic transmissions. As the flow rate varies, so is the speed of the vehicle varied.

When the control arm 38 is moved rearwardly, the pivotable shaft 41 will rotate in a counterclockwise direction thereby moving arms 52 and interconnecting means 58 downwardly a distance B thus moving connecting means 56 downwardly placing the activating means 55 of the hydrostatic transmissions 17 and 19 in a position so as to reverse the direction of travel of the vehicle.

As mentioned hereinabove, the control arm 38 is shown in a neutral position and is inclined to return to this position through the use of neutralizing springs 100 which are connected to coarse speed control 34 of the vehicle.

The just described construction of fine speed control 36 provides an override means which can be activated even when said fine speed control is engaged simply by moving control arm 38 of the coarse speed control. That is to say when fine speed control 36 is engaged by control lever 86 it may be rotated so that it is moved linearly to a particular desired position so as to cause the vehicle to traverse the ground at a desired rate of speed. When the operator desires to alter the rate of speed he need only move control arm 38 of coarse speed control 34 to the position corresponding to the change in rate of speed in which he wishes to traverse the ground. Such adjustment of control arm 38 will allow fine speed control 36 to be overridden, thereby placing the vehicle at the desired rate of speed.

Alternatively, should the work providing means become overloaded or, for that matter, merely encounter an increased load, the operator may move the control arm rearwardly thereby decreasing the rate of speed at which the vehicle crosses the terrain. Thus, if a trencher is used, the slower rate of speed of the vehicle will permit the trencher to adequately handle the increased or peak load situations. Similarly, if other work performing means such as mowers, are used the decreased speed of the vehicle will permit it to handle the increased load and to function essentially automatically when it encounters various load situations.

The manner of operation of the override means is as follows, assuming that the fine speed control 36 is engaged and has been set in desired position A and the vehicle is traversing the ground at the corresponding rate of speed. To establish this condition control lever 86 is engaged between the helix of spring 70. The main body portion 68 of the fine speed control, upon rotation of said spring, has been moved linearly relative to the position of the control lever in the helix of the spring. This linear movement of fine speed control 36 has caused an associated movement through distance A, of the interconnecting means 58. Since interconnecting means 58 is an integral part of the coarse speed control lower linkage 51, movement of the interconnecting means will directly impart a similar movement to arms 52. Further since control arm 38 is rigidly mounted to control shaft 40, it will also be moved relative to the vertical movement of interconnecting means 58 caused by the movement of fine speed control 36. Therefore, as shown in FIG. 3, the entire speed control mechanism 34 is repositioned in direct relationship to the linear movement of fine speed control 36 and the associated movement of interconnecting means. When coarse speed control 34 is in the position A, the operator can override the setting of the hydrostatic transmission by simply moving control arm 38 to whatever new position he desires. This repositioning of the control arm 38 will pivot the entire lower linkage, arms 52 and interconnecting means 58 in direct relation to the movement of said control arm thereby either compressing or extending the portion of the spring between the control lever 86 and the supporting means 66. Therefore, even though the fine speed control is locked in a particular position to control the rate of speed of the vehicle, an operator can manually, while keeping the fine speed control engaged, change the rate of speed by moving control arm 38. The fine speed control includes a portion which expands or contracts thereby permitting the entire lower linkage 51 to be moved accordingly. Thus, by selectively varying the position of control arm 38, an operator can vary the speed of the vehicle without changing the setting of the fine speed control.

When the operator disengaged control lever 86 from the helix of spring 70 neutralizing springs 100 which are operably associated with coarse speed control 34, will return the entire control means 18 to its neutral position. This movement by the entire control means 18 and more specifically fine speed control 36, to its neutral position upon disengagement of control lever 86 from the helix of spring 70 is significant in that everytime the operator wishes to re-engage the fine speed control 36 he will have the entire length of spring with which to operate rather than simply the remaining portion of thread he has left from his previous use of the fine speed control.

A further advantage of the described fine speed control is presented under conditions where a significant resistance to the motion of the vehicle is encountered. Under such conditions, a resulting increase in pressure is generated in the hydraulic motor. This increase in pressure will be fed back to the hydraulic pumps and as a result, the pressure feedback will cause the activating means associated with said pumps to attempt to return to their neutral positions. If the fine speed control rigidly maintains interconnecting means 58 and the entire lower linkage 51 of coarse speed control 34 at a particular position, the activating means would be prevented from moving towards its neutral position thereby possibly causing damage to the equipment. The fine control means of the present invention is designed so that when the activating means of the hydrostatic transmission desires to automatically return to its neutral position, its movement and the associated movement of connecting means 56 and the entire lower linkage 51 of the coarse speed control 34 will be permitted to move accordingly. It is, therefore, noted that the fine speed control while placing the vehicle in a desired rate of speed can be automatically or manually overriden to prevent damage to the equipment and to generally facilitate in the operation of an earthworking vehicle.

From the foregoing, it will be seen that the invention provides a fine speed control which has a main body portion having a spring capable of extending or contracting after the fine speed control is engaged and manually set to a predetermined speed rate, so that the rate can thereafter be automatically or manually overriden in accordance with a given situation. Thus, the system is operative not only for an increased workload of a work performing means associated with the vehicle, but also may be used in emergency situations in which the speed rate of the vehicle must immediately be changed. Furthermore, the system resists self damage to the equipment due to overload.

While the preferred structure in which the principles of the present invention have been incorporated as shown and described above, it is to be understood that the invention is not to be limited to such particular details, but that, in fact, widely different means may be employed in the practice of the broader aspects of the invention.

Having thus described our invention, what we claim is:

1. Improved vehicular control apparatus comprising, in combination,
   A. a frame,
   B. ground engaging means mounted on the frame,
   C. drive means operably connected to the ground engaging means,
   D. control means mounted on said frame and associated with said drive means, said control means comprising
      1. a coarse speed control having means to vary over a full range of positions the power to said drive means for controlling speed of the vehicle,
      2. a fine speed control having a main body portion comprising a spring adapted to respond to changes in the position of said coarse speed control varying means, and means for engaging the spring to permit said fine speed control to set said coarse speed control at any one of a plurality of positions over said full range, whereby said drive means is allowed to automatically respond to changing power requirements; and
      3. means for interconnecting said coarse and fine speed controls, so that movement of one will directly effect the movement of the other.

2. Improved vehicular control apparatus, as set forth in claim 1, wherein said fine speed control includes means for maintaining said engaging means in cooperative engagement with said spring, and said engaging means being further adapted to move out of engagement with said spring to disengage said fine speed control.

3. Improved vehicular control apparatus, as set forth in claim 2, wherein said engaging means comprises a control lever pivotally mounted for movement into and away from said sprinig, and a positioning spring to bias said control lever in the direction of the main body portion.

4. Improved vehicular control apparatus, as set forth in claim 3, wherein said spring includes coils adapted to register with said control lever.

5. Improved vehicular control apparatus, as set forth in claim 4, wherein said main body portin of said fine speed control further includes a rod positioned in the center of said spring, a knob rigidly secured to one end of said spring, said knob having a receiving portion adapted to receive one end of said rod, and holding means positioned in the receiving portion of said knob for securing the said one end of said rod to said knob, said rod at its opposite end being connected to said interconnecting means.

6. Improved vehicular control apparatus, as set forth in claim 5, wherein said holding means secures said one end of said rod to said knob so as to allow rotation of said knob relative to said rod, whereupon rotation of said knob, said spring will rotate with said knob relative to said rod such that, under conditions where said control lever is engaged in the coils of said spring, said spring, knob and rod will move linearly relative to the position of said lever and effect movement of said coarse speed control via said interconnecting means.

7. Improved vehicular control apparatus, as set forth in claim 1, wherein said varying means comprises a rotatable control shaft mounted to said frame, a control arm having one end rigidly mounted to said shaft, and arms extending perpendicularly from said shaft, said arms having one end rigidly connected to said shaft so that movement of either the arms or the control arm will impart a corresponding movement to the entire varying means.

8. In a vehicle comprising:
   A a frame,
   B ground engaging means mounted on the frame,
   C hydrostatic drive means mounted on the frame and operably connected to the ground engaging means to propel the vehicle over the ground,
   D control means mounted on said frame and operably associated with the hydrostatic drive means to control the speed of the vehicle, said control means comprising
      1. a coarse speed control having means to vary the hydrostatic drive means over a full range of positions to control the speed of the vehicle,
      2. fine speed control having a main body portion which comprises a spring adapted to expand or contract, and an engaging means associated with said spring to maintain said fine speed control at a particular desired position, whereby said spring upon engagement by said engaging means can expand or contract in response to movement by said varying means of the coarse speed control, and
      3. means for interconnecting said coarse and fine speed controls.

9. The vehicle, as set forth in claim 8, wherein said interconnecting means comprises a rigid member extending from said varying means and having one end rigidly secured to said varying means and another secured to said fine speed control so that movement of said varying means will impart a corresponding movement to said fine speed control, while likewise movement of the fine speed control will be imparted to the varying means and thereby said coarse speed control.

10. The vehicle, as set forth in claim 9, wherein said varying means comprises a rotatable control shaft mounted to the frame,
   a control arm having one end rigidly mounted to said shaft and extending perpendicularly from said shaft, arms extending perpendicularly from said control shaft, said arms having one end rigidly mounted to said shaft, and connecting means having one end mounted to said arms and another end operably associated with said hydrostatic drive means so that movement of the arms will cause a corresponding movement of the connecting means thereby placing the hydrostatic drive means in a different mode causing a rate of speed change of the vehicle.

* * * * *